Patented Aug. 25, 1936

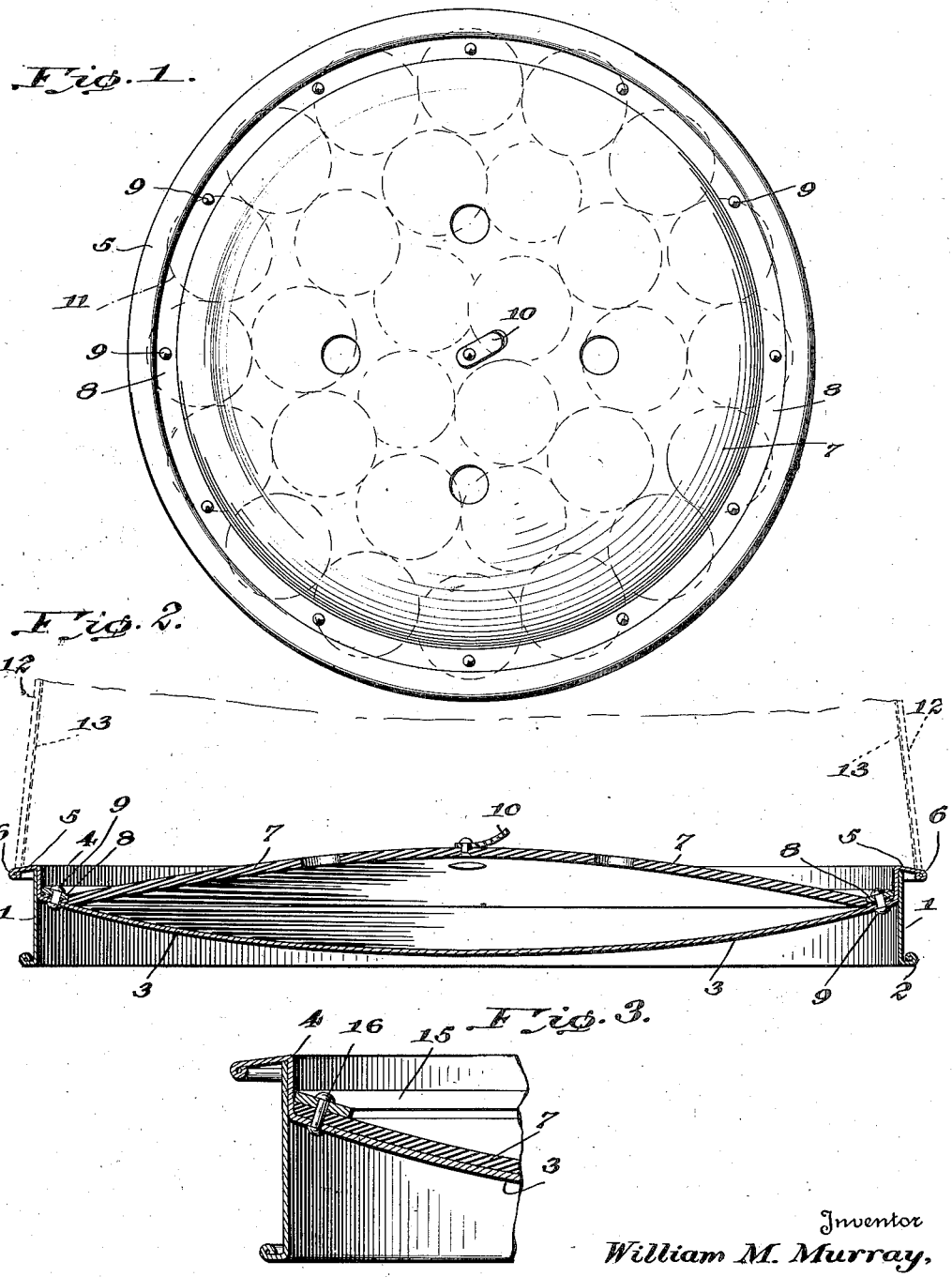

2,052,242

UNITED STATES PATENT OFFICE 2,052,242

ATTACHMENT FOR PACKING FACER PLATES

William M. Murray, Macon, Ga., assignor of one-half to Georgia Peach Growers Exchange, Macon, Ga., a corporation of Georgia Application April 22, 1935, Serial No. 17,749
Renewed June 25, 1936

1 Claim. (Cl. 226—17)

My invention relates to improvement in attachments for packing facer plates, and it consists in the combinations, constructions and arrangements herein described and claimed.

In the packing of fruit, such as peaches, apples and the like, it has been the custom to place the top layer of the fruit in concentric rows, this top layer being rounded so as to permit the cover when placed thereon to hold the fruit firmly in place, and to compensate for the movement of the fruit into a more compact mass during transit or in handling.

Devices for aiding in the arrangement of the fruit in concentric rows have been in use, these devices being termed "packing facer plates". They generally consist of a ring having a plate carried thereby on the interior thereof, this plate being bent to conform with the curvature of the layer of fruit. The plate is used in inverted position when arranging the fruit so that when inverted the plate upon which the fruit is placed is concave. It is necessary in starting the concentric rows of fruit to begin at the outside edge of the plate next to the ring and then work toward the center, usually one apple or peach or whatever is being packed, being placed at the center.

When the layer is arranged thus, and a form of substantially cylindrical shape open at both ends is placed over the plate and fruit is piled in this form. A basket is then inverted and brought down over the form and the plate and the whole is inverted and the fruit passes into the basket with its top layer in concentric rows and also rounded or in convex shape, ready for the cover to be put on. One trouble in using a concave plate is the difficulty of holding the fruit while placing in the concentric rows. The tendency is for the fruit to roll to the center. Furthermore, there must be some abutment against which the first apple or peach of the outer row must be placed and the others then are placed in sequence.

An object of my invention is to provide a packing facer plate which does not require the holding of the fruit while placing the latter in concentric rows, but which, owing to movement of a portion of the plate, will provide for the rounding or convex shape of the upper layer when the basket is filled.

A further object is to provide a device which obviates the necessity of an abutment for holding the first piece of fruit placed in the outer concentric row in position.

A further object is to provide an attachment which can be readily made to those forms of packing plates which now have concave plates.

A further object of the invention is to provide a device of the type described in which the packing of the fruit is greatly facilitated, due to the fact that when placing the fruit in concentric rows the fruit has a tendency to gravitate toward the outside instead of toward the center.

Other objects and advantages will appear in the following specification and the novel features of the invention will be particularly pointed out in the appended claim.

My invention is illustrated in the accompanying drawing forming part of this application, in which:

Figure 1 is a plan view of a device constructed according to my invention.

Figure 2 is a sectional view through the plate showing it in position for packing fruit, and, Figure 3 is a view of a modified form of the device showing it in its collapsed position.

In carrying out my invention I make use of a ring 1 of galvanized iron or any suitable material. The lower edge of the ring is preferably rolled to provide a bead 2, so that when the ring is placed on a supporting surface it may be easily moved laterally without catching on a sharp edge.

Disposed within the ring is a concave plate 3 which is substantially of the diameter of the ring. This concave plate has a cylindrical portion 4 which fits against the inner wall of the ring, and it is provided with an overhanging flange portion 5, the latter preferably having a bead 6 on the edge thereof.

The device thus far described has been in general use. The fruit has been arranged in concentric rows and in convex form by placing the fruit on the plate 3 and then inverting it, as described. The difficulty in maintaining the concentric rows of fruit on the plate 3 led to the provision of the attachment which renders the packing of the fruit much more easily done.

In Fig. 2, I have shown a fruit supporting surface 7 which in the present instance I have indicated as a piece of stiff thick rubber. Along the periphery of this piece is a recessed portion arranged to receive a band 8. Rivets or bolts 9 are provided by means of which the edges of the supports 7 are firmly secured to the plate 3. The support 7 conforms to the curvature of the plate 3, as is shown in Fig. 3, where the support has been collapsed against the plate 3. In order to pull the flexible support 17 into a convex position I make use of a short strap 10 which is secured to the central portion of the support.

In packing fruit with my improved packing facer plate, the support 7 is pulled upwardly away from the plate 3 and the material of which the support 7 is made is of sufficient rigidity to maintain this support under the weight of a row of fruit. With the support 7 in position shown in Fig. 2, the fruit is placed in the outer concentric row 11, see Fig. 1, and succeeding concentric rows may be made while the support is in its convex form. There is no tendency for the fruit to roll to the center. On the contrary it tends to move to the outer portion, thus permitting the fruit to be put in very rapidly, since one does not need to hold the fruit in position.

When the fruit has been faced in the rows as shown, the support 7 is forced downwardly into contact with the plate 3 as shown in Fig. 3. A form 12 which may be lined with paper 13 or other suitable lining is then placed on top of the flange 5, and the fruit is piled into this form (the upper end of the form being open) until enough has been placed therein so as to fill a basket of predetermined size. The form 12 is now removed, the fruit being held in place by the paper liner 13. The basket is now placed over the liner and the fruit, which fills the basket in the inverted position. The basket, liner, fruit and facer plate are now inverted and the facer plate is removed, the upper layer of fruit in the basket being rounded or convex and the fruit being in concentric rows.

In Fig. 3, I have shown a modified means for holding the support 7. In this instance the edge is not recessed to receive the band 15, but the support 7 extends to the wall 4 of the plate 3 and is riveted or otherwise secured to the plate 3 by a fastening member 16.

While I have spoken of the support 7 as being made of rubber sufficiently thick and rigid to support a layer of the fruit, yet in actual practice the device may be made of any suitable flexible material which when pulled away from the plate 3 will remain in position to support a layer of the fruit, but which can be pushed downwardly to form a concave plate, which when inverted, will give the rounded form to the layer.

I claim:—

A device of the type described comprising a rigid concave plate, a supporting ring surrounding the plate, a disk, means for securing the disk to the plate at the edge thereof, said disk being adapted to engage the plate and being made of resilient material whereby that portion within the secured edge may be moved away from the plate into a convex form, and being of sufficient rigidity to support a layer of fruit while in said convex form.

WILLIAM M. MURRAY.